Inventor
RAYMOND. E. RICE

April 8, 1930.  R. E. RICE  1,753,200
CASH REGISTER
Filed Aug. 27, 1924    4 Sheets-Sheet 3

Inventor
RAYMOND. E. RICE

April 8, 1930.                R. E. RICE                1,753,200
                             CASH REGISTER
                    Filed Aug. 27, 1924     4 Sheets-Sheet 4

Inventor
RAYMOND. E. RICE

By A. A. Hicks and
H. C. Diserud
Attorneys

Patented Apr. 8, 1930

1,753,200

UNITED STATES PATENT OFFICE

RAYMOND E. RICE, OF ILION, NEW YORK, ASSIGNOR TO REMINGTON ARMS COMPANY, INC., A CORPORATION OF DELAWARE

CASH REGISTER

Application filed August 27, 1924. Serial No. 734,498.

The invention relates to cash registers and accounting machines generally and more particularly to that class employing a plurality of totalizers with or without associated printing devices for printing the accumulated items and totals.

A large number of corporations such as grocers, oil and gasoline vending companies, shoe manufacturers and the like have appointed throughout the United States or a given territory a number of retail stores which exclusively or otherwise retail the stock or wares of the parent corporation. These stores are known as "chain stores" and while they are situated at different and distant points the management of them is directly controlled by a head office, generally situated in a large city. To supervise each chain store a manager is appointed and placed in charge and upon him rests the responsibility of conducting the affairs of the store, as if he were the sole proprietor.

Daily reports are sent into the head office stating the sales made, the goods on hand and what is required for the future. The bookkeeping department of the head office also receives an itemized record strip showing the amount of the daily sales and, at intervals, causes its auditor to visit each store to check the amount of the sales for the month against the amount which is indicated as proper when the merchandise is inventoried. In this manner any attempt to defraud the corporation is readily ascertained and minimized.

The illustrative machine in which the present invention is disclosed is provided with a plurality of totalizers one for accumulating the sales of a day and the other the total sales for a month, but it is to be noted at this point that these periods are merely mentioned for purposes of illustration and can be made in practice to conform to the exigencies of any particular business. Both of the totalizers are adapted to receive precisely the same entries and therefore they are herein disclosed as being simultaneously operated.

Suitable printing mechanism is also provided to print each item upon a record strip, with an additional provision for making extended written notations adjacent to each printed item. The sales for the day can, therefore, be printed upon the record strip, and at the close of the day the printed section of the strip may be detached from the machine and forwarded to the head office.

In the particular machine herein disclosed means are provided to prevent access to the mechanism for printing daily sales by unauthorized persons. While the total of daily sales may be obtained and recorded by the manager he cannot obtain the sales for a period, such as a month (except by adding independently of the machine the daily amounts indicated on the record strips) since the printing from the monthly totalizer is permitted to be performed only by the auditor, or one who has the key of a special lock controlling this operation.

The printing of the daily totals may according to this invention be under control of a lock, the key of which is retained by the proprietor or manager and since the totalizer from which these totals are obtained is accessible to him he could, if so inclined, readily change the printed total by improperly turning the totalizer wheels backwardly. An incorrect total can, of course be checked by the addition of the item indicated on the record strip, but to more effectively insure a correct total being printed and to defeat any attempt to defraud the company a second monthly or auditor's totalizer is provided which is concealed and guarded by a shield. The release of this shield by unlocking it through the use of a special auditor's key permits the printing of the monthly or "secret" total and resetting it to zero.

Printing of the daily or monthly totals may also cause printing of an identifying character upon the record strip denoting the "register number", which serves to identify the location of the register, or the origin of the record strip. This identifying character type element may be readily removable so that in the event that a manager is placed in charge of another store or station the type can be easily removed and placed in the new register which he is to control.

The above is merely an example of one use of the register and it will be readily understood that the same mechanism can be adapted for use in any other analogous business and it is not intended to limit its application to the lines of business in connection with which it is described herein.

With these and incidental objects in view the invention consists in certain novel features of construction and combination of parts, the essential elements of which are set forth in the appended claims, and a preferred form of embodiment of which is hereinafter described with reference to the drawings which accompany and form part of the specification.

For the purpose of illustration this invention has been shown as applied to a type of machine the general principle of which is disclosed in the U. S. applications S. N. 263,125 filed November 19, 1918, and S. N. 283,720 filed March 20, 1919, by Frederick L. Fuller, but it is to be understood that this invention is not limited to this type of machine, but may with equal facility be applied to other well known forms of accounting machines. It will not be necessary to describe here in detail the various features of the illustrative machine with which the present invention has been shown as embodied, since reference may be had to said Fuller applications for a complete disclosure. A brief description of the general setting of the present invetnion will now be given.

Framework

Figures 6, 7, 8:
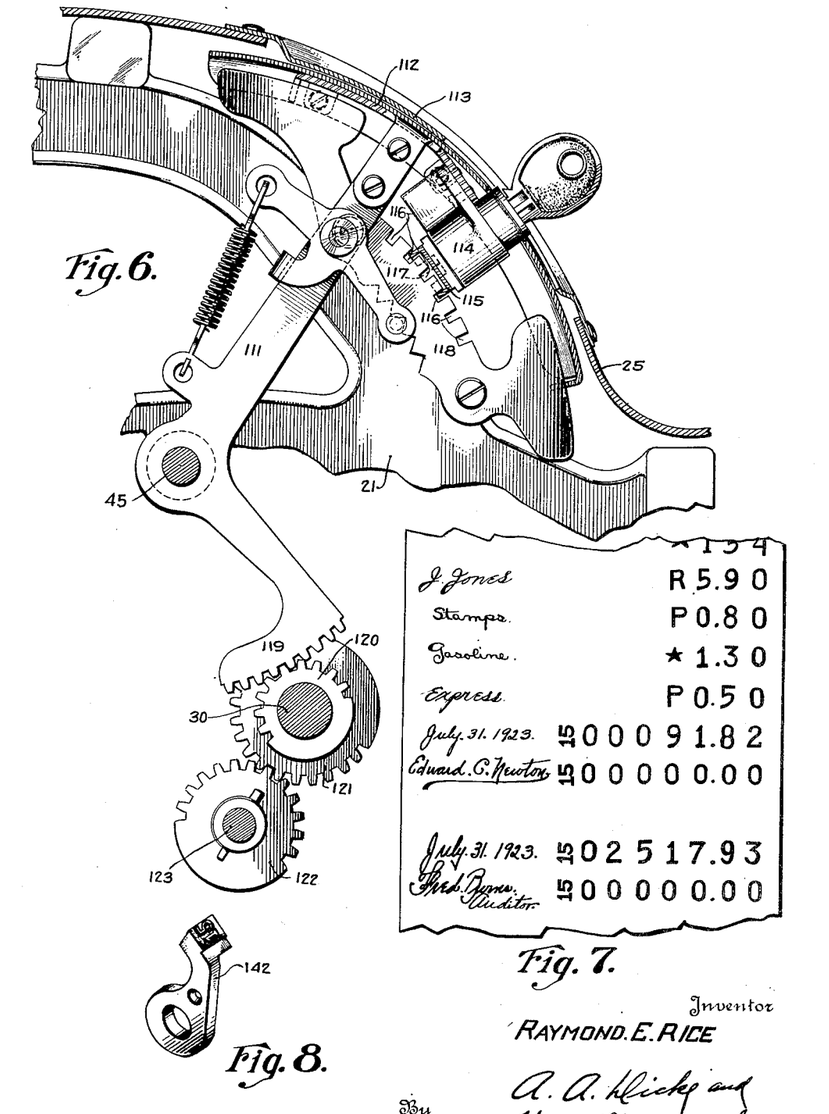
Fig. 6 is a transverse sectional view showing the centralized control lever for releasing the lids hinged to the cabinet and for performing other general controlling functions.
Fig. 7 is an illustration of a portion of the printed record strip showing the printed items and the totals from each totalizer.
Fig. 8 is a perspective view of the type element for printing an identifying character adjacent to the printed totals.

The various parts of the mechanism are supported by a suitable framework comprising a base casting 20 and suitable side frames one of which is shown in Fig. 6 and indicated by reference character 21. The main side frames are connected at their upper rear ends by a frame 23 and cross connection in the form of tie bars 24 and 33 situated in the lower rear and front part of the machine respectively. The present machine is also provided with two intermediate frames 56 which are parallel to the side frames and which will be described more in detail hereinafter. A suitable cabinet is employed for enclosing the mechanism and it is preferably formed in one piece out of metal although it may be formed in several pieces and of other material if desired. The cabinet 25 has hinged thereto a flat lid 26 and a front cover 27 for providing access to the mechanism for replenishing the paper supply, for printing the total from the upper totalizer and for resetting the same as will be explained, hereinafter.

Keys and operating mechanism

Figure 1:
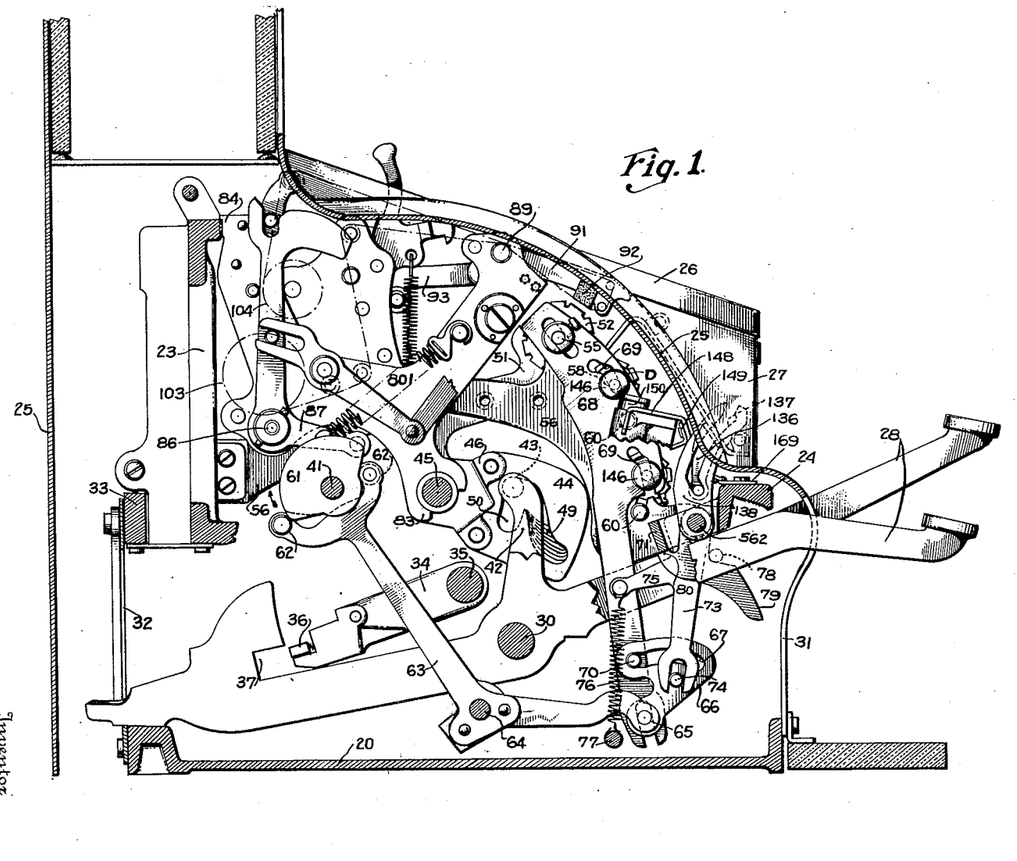
Fig. 1 is a sectional view of the cash register taken toward the left end of the machine showing a pair of the keys, the item and total printing devices and the differential mechanism for driving the totalizer elements.
Figures 2, 9:
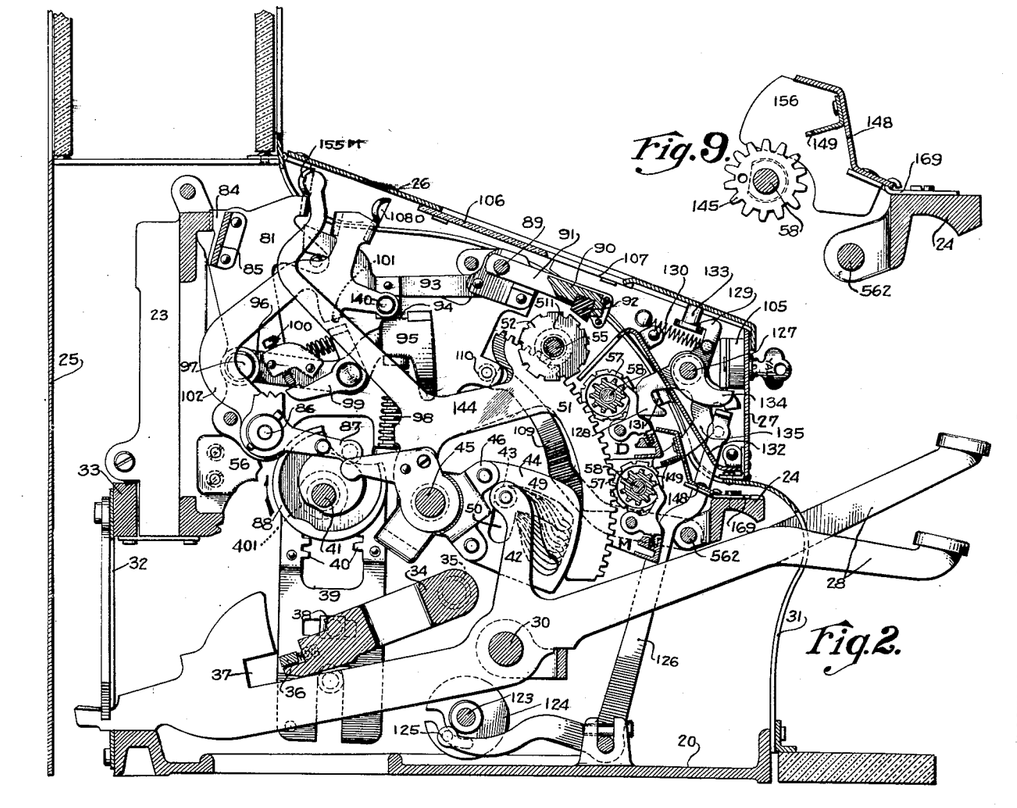
Fig. 2 is a transverse sectional view taken substantially through the center of the machine.
Fig. 9 is a partial view showing how the totalizer shield effectively prevents operation of the resetting device.

The illustrative machine is provided with a number of groups of amount keys, several of these being shown in Figs. 1 and 2 in connection with the dimes group of keys, and indicated by reference characters 28. There is also provided a number of transaction keys for controlling the operation of the totalizers and denoting the nature of the transaction entered in the machine.

The amount and transaction keys are pivoted upon a shaft 30 extending transversely and journaled between the side frames of the machine. The keys are guided in their reciprocating movements by slots 31 formed in the front part of the cabinet 25 and are guided at their rearward ends by a vertically slotted plate 32 attached to the tie bar 33. Resting upon the rear ends of the keys is a key coupler 34 journaled at 35 between the side frames. The key coupler 35 has a nose 36 co-operating at times with notches 37 formed in the rear ends of the keys 28. When the outer ends of the keys are depressed the key coupler 34 is rocked clockwise (as viewed in Figs. 1 and 2) and the nose 36 thereon enters the notches 37 formed in the rear ends of the keys. The purpose of such key coupler mechanism is well known in the art and need not be discussed herein.

Connected to the key coupler at 38 is a vertical reciprocable rack plate 39 (Fig. 2) formed with oppositely facing rack teeth 40 which alternately mesh with a gear 401 (Fig. 2) fast to the main operating shaft 41 journaled between the machine side frames. The arrangement of this mechanism is such that a reciprocation of the key coupler 34 by the keys will effect a complete rotation of the gear and the shaft 41 to which the gear is secured. The shaft 41 which is designated as the main operating shaft and is given a complete rotation at each operation of the machine and carries cams and other devices for operating various parts of the registering and printing mechanism.

In nearly all forms of cash register construction it is essential after a registration has commenced that some device be provided to compel the complete performance of the registering mechanism before a subsequent operation of the machine can be effected. For the accomplishment of this function the present machine is provided with a ratchet wheel attached to the shaft 41 against which bears a spring-pressed pawl, neither of which are shown in the drawings, but which are shown and described in considerable detail in the Fuller application S. N. 263,125 hereinbefore referred to.

Differential mechanism

The differential mechanisms or devices controlled by the various groups of keys for adjusting the item type carries and actuating the several totalizers are all similar in construction and principles and a description of one will suffice for all. As shown in Figs. 1 and 2 each of the amount keys 28 associated with the dimes bank of keys is provided with an upwardly extending arm 42 carrying a suitable anti-friction roller 43 co-operating with a slot formed in a corresponding one of a series of cam plates 44. Loosely mounted upon a transverse shaft 45 journalled in the machine side frames and passing through a bracket 561 (Fig. 3) carried by one of the frames 56 is a frame 46 provided with spaced slots in which are secured the series of cam plates 44, one for each key. The cam plates 44 are provided with L-shaped slots having branches 49 and 50, the branches 50 being concentric with respect to the shaft 45 while the branches 49 are graduated so that when the roller 43 carried by the arm 42 of a depressed key operates in the slot 49 of its associated cam plate 44, it will move the frame 46 differentially and to an amount corresponding to the value of the key depressed. When, however, the frame 46 is operated by the depression of a key 28 the rollers 43 of the undepressed keys will play in the arcuate slots 50 of their respective cam plates 44, thereby permitting the frame to be raised differentially without interfering with the rollers 43 of the unoperated keys.

It is to be understood that there is a differential frame for each group of amount keys, i. e., for the pennies bank, dimes bank, dollars bank, etc. and one for the transaction keys as well.

As shown in Fig. 2 the differential frame 46 has attached thereto a segmental rack 51. In continuous mesh with the segmental rack 51 is a pinion 511 attached to an item type wheel 52 adapted to print upon a record strip printing mechanism. From the above it will be evident since there are nine keys in the dimes group and a corresponding number of cam plates 44, the segmental rack 51 and type carrier 52 may be brought to any one of nine different positions by depression of a selected key 28 associated with the dimes group of keys. In a manner similar to this the keys associated with other denominational groups will also adjust the type carrier 52 so that when printing is effected the type wheel will print a character corresponding to the value of the key depressed.

Figures 3, 4, 5:
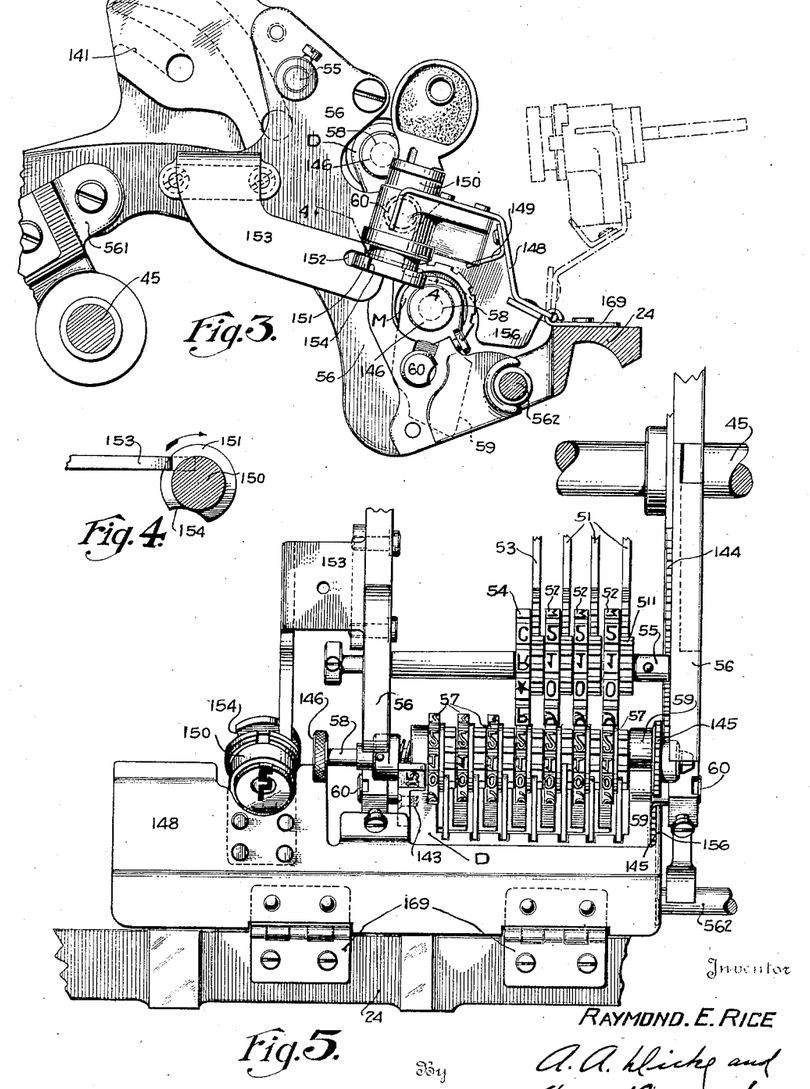
Fig. 3 is a partial view in elevation showing the two totalizers and the shield for one of them as well as the lock for preventing access thereto.
Fig. 4 is a view taken on the line 4—4 of Fig. 3.
Fig. 5 is a top plan view of the item wheels, the upper totalizer and the shield for the lower totalizer.

As best shown in Fig. 5 the illustrative machine is provided with three segmental racks 51 for adjusting the amount item type carriers and a segment 53 for adjusting a transaction type carrier 54 which is controlled by a series of transaction keys in a manner similar to that which has been explained in connection with the amount keys. All the item type carriers are loosely mounted upon a shaft 55 which is journaled between the two intermediate parallel frames 56, which are attached at their rearward ends to the frame 23 and at their forward ends to a shaft 562 journaled in ears integral with the bar 24.

Totalizers and engaging mechanism

Situated below the item type carriers are two pivoted totalizers (Figs. 1 and 2) designated by the letters "D" and "M". The three right hand pinions (Fig. 5) of the two totalizers are adapted to be brought simultaneously into mesh with the teeth of the segmental racks 51. Each totalizer comprises a series of seven wheels 57 the peripheries of which are formed with raised characters so as to effect printing upon a suitable impression material. The printing wheels 57 are loosely mounted upon a shaft 58 which is carried by a frame work 59, the frame work being journaled at 60 to the side frame 56. The pivotal points 60 are the pivots of the totalizers which are adapted to be rocked about these points as a center so as to bring the totalizer pinions in mesh with the actuating racks 51 at the desired time.

The totalizer "D" in the present machine is adapted for the accumulation of individual items comprising the sales of any arbitrary period, such as, for the sake of example, sales for a day. After the total standing thereon has been printed upon the record strip the accumulating elements are returned to their normal or zero position in preparation for accumulating another series of items or transactions for a successive period. The totalizer "M" is provided to accumulate the grand totals of all the items entered in the machine and is adapted to be reset at the termination of a period longer than a day, as for example, at the end of each month. The totalizer "M" is designed to be reset by an auditor and is controlled by a separate lock so that the auditor alone can obtain the total of this totalizer and is capable of resetting it to its normal position.

For the purpose of moving the two totalizers simultaneously into engagement with the actuators 51 a slide 68 is provided. This slide as best seen from Fig. 1, is provided with a slot at its upper end engaging over the shaft 55 of the item type wheels, while at its lower end it is forked to engage a pin 65. Suitable cam grooves 69 are formed in the slide to engage the supporting shafts of both of the totalizers so that as the slide is moved downwardly by the means hereafter described, the two totalizers will be moved into engagement with the actuators. The means for causing the downward movement of the slide includes a bell crank lever 63 which is pivoted upon a shaft 64 and which carries at the end of its forwardly projecting arm the pin 65 heretofore mentioned. At the extreme end of the other arm of this bell crank it is provided with a pair of rollers 62 which are adapted to co-operate with a pair of complementary cams 61 mounted on the main operating shaft 41, so that upon each operation of the machine the bell crank 63 will be first rocked clockwise and then counter-clockwise. A special connection is provided between the pin 65 and the slide 68 this connection being in the form of a plate 66 pivoted about the pin 65 and carrying a cam groove 67 at its upper end to co-operate with a pin 70 carried by the slide 68. It will be seen that through this connection the slide 68 will normally follow the movement of the pin 65 as the bell crank 63 is rocked.

*Totalizer throwout mechanism*

During certain transactions which may be recorded in the machine, such as, "Charge,"— "Paid out,"—and "No sale" no receipt of money is involved, and it is therefore not necessary or desirable during such transactions to operate the totalizers which are intended to indicate amounts of cash.

Upon an operation of the transaction keys which do not involve the receipt of money certain mechanism comes into play which prevents the meshing of the totalizers with the actuating racks. The mechanism for accomplishing this function comprises a bail 71 loosely mounted upon the shaft 562 previously referred to. The bail 71 has integral therewith a downwardly extending arm 73 bifurcated at its lower end to engage a stud 74 secured to the plate 66 which may be called the totalizer throw-out plate. The bail 71 is also provided with a rearwardly extending arm 75 to which is connected a coil spring 76, the opposite end of the said spring being attached to a tie bar 77 near the base of the machine. Each of the special transaction keys is provided with a pin 78 adapted to ride along the forward face of a related camming plate 79, which has a finger 80 contacting with the under side of the bail 71.

When a key carrying a pin, such as, 78 is depressed, it will be readily seen that the cam plate 79 will raise the bail 71 upwardly stretching the spring 76 and rocking the plate 66 rearwardly from the position shown in Fig. 1 so that the cam groove 67 tends to elevate the slide 68. During the initial operation of the keys the rotation shaft through the bell-crank 63 will tend to force the slide 68 downwardly, but by means of the cam slot 67 engaging the pin 70 the tendency of a downward movement of the counter control slide 68 will be nullified so that the slide 68 will remain substantially in the position shown in Fig. 1, thereby preventing any operation of the totalizers when a throw-out key is operated. Thus while the pin 65 will be lowered upon the initial movement of the shaft 41 the slide 68 will only be correspondingly lowered provided the plate 66 remains in its normal relative position. However, when the plate 66 is rocked toward the rear at the same time, due to the depression of a throwout key the slide 68 will be elevated with respect to the pin 65 on account of the action of cam slot 67 on pin 70. The resultant effect of lowering the pin 65 and lifting the slide 68 relative to this pin will be to leave the slide in substantially its normal position and the totalizers will not be engaged with the actuating segments.

*Record strip printing mechanism*

It is desirable each time an item is entered in a machine that its amount as well as the nature of the transaction be printed upon a record strip. The record strip thereby provides a complete record of all the transactions entered in the machine and at the end of any particular period it may be detached from the machine and sent to the head office to be checked and stored away for future reference. The printing mechanism for printing these items as well as the totals standing upon the totalizer comprises a pivoted printing frame formed of two side frames 801 and 81, (Figs. 1 and 2) the lower ends of which are provided with claws 83 overlying the shaft 45, a cross member 85 and shafts and other members which will be referred to hereinafter. Normally the printing mechanism rests in the position shown in Figs. 1 and 2 with lugs 84 to the rear of the cross member 85 in engagement with a cross rib of the rear frame 23. In this normal position the printer frame is adapted to print the items entered in the machine upon the record strip, but it may be rocked downwardly under the control of separate manipulative devices to print from either the totalizer "D" or the totalizer "M" as will be more clearly described hereinafter.

Journaled in the printer side plates 801 and 81 is a shaft 86, the extreme left end of which has fastened to it a bell-crank 87 carrying a roller which coacts with the race of a box cam 88 fast to the shaft 41. As has been mentioned hereinbefore the shaft 41 is given a complete rotation during each operation of the machine and rotation of the box cam 88 will rock the shaft 86 to actuate a platen and to feed the record strip. These mechanisms have been fully described in the Fuller applications mentioned before and it is therefore merely necessary to briefly touch upon them here.

Extending transversely of the printer side frames 801 and 81 and journaled therein is a platen shaft 89 upon which is supported the platen 90 by means of forwardly extending arms 91 (Fig. 2) secured to the shaft 89. The under face of the platen 90 is provided with a rubber impression block 92.

Extending rearwardly from and connected with one of the arms 91 is a platen actuating arm 93 provided with a lug 94 which is actuated by a hammer 95 to force the platen 90 against the type to take an impression. The hammer 95 is formed as part of an arm 96 pivoted to the inside of the right printer side frame 81 by a stud 97 and it is forced upwardly by a spring 98 compressed between the hammer and a lug carried by the right printer frame 81. The arm 95 is furthermore provided with a spring-pressed retracting pawl 99 having a tail bearing against an adjustable stop 100 carried by the arm 96. The pawl 99 has a lug co-operating with a nose 101 formed as part of an arm 102 which is secured to the main printer shaft 86.

When the arm 102 is rocked clockwise by means of the bell-crank 87 and shaft 86 to which it is secured, the nose 101 on the arm 102 will bear against the lug of the pawl 99 and retract the hammer against the action of the spring 98. Upon further movement of the arm 102 the nose will clear the lug of the pawl 99 and permit the hammer portion 95 to strike the lug 94 of the platen arm 93 and rock the platen downwardly to effect a printing impression from the adjusted type carriers.

The record strip upon which are printed the items and totals is shown diagrammatically in Fig. 1 of the drawings, the paper extending from a supply roll 103 around suitable guide rolls, around the platen 92, around other guide rolls, and finally back to the storage roll 104. The details of the manner of supporting the record strip, as well as the means for advancing it during the operation of the machine are fully set forth in the Fuller application S. N. 263,125 and therefore, need not be described here.

The machine is further equipped with an inking ribbon, but it is not shown in the drawings, nor is the ribbon feeding mechanism shown since these do not comprise any part of the present invention. One form which this mechanism might take is clearly shown and described in the Fuller application S. N. 263,125 to which reference may be had for further details of construction and operation.

In order to cover and conceal the record strip printing mechanism there is provided a pair of lids 26 and 27 hinged to the cabinet. The lid 26 is controlled by a lock 105 whose operation will be discussed in a later section and which is attached to the cover 27. The key of this lock is usually retained by the clerk operating the machine so that he can raise the lid 26 to obtain access to the paper holding mechanism in order to replenish the supply of paper when it is exhausted.

Secured to the under side of the flat lid 26 there is provided a glass 106 to render visible a portion of the record strip containing a number of items which have previously been entered in the machine. The glass is cut away at 107 to permit written entries to be made in juxtaposition to the printed items in a manner clearly shown in Fig. 7 of the drawings.

Printing of daily totals

To take the daily totals from the totalizer "D" all that is necessary is to swing the printer frame until the platen is directly over the totalizer "D" and when the platen is in this position it will automatically be actuated and the total standing on the "D" totalizer printed upon the record strip.

To rock the printer frame downwardly there is provided a manipulative device $108_D$ (Fig. 2) which is integral with the arm 102 above mentioned. As shown in Fig. 2 the manipulative device $108_D$ is located under the lid 26 and since the clerks operating the machine have possession of the keys of the lock controlling the release of this lid an additional lock is provided for preventing unauthorized persons from operating the manipulative device $108_D$ to take a total from the upper counter. This lock comprises a rearwardly extending arm 109 (Fig. 2) fast to the shaft 562, previously referred to, and normally contacting with a stud 110 secured to the printer side frame 81. The disabling of this locking arm to permit rocking of the printer frame to take a total is under control of a lock, the key of which is retained by the proprietor or manager of the store. This disabling mechanism as well as the devices for releasing both lids will now be described.

Loosely pivoted upon the segment shaft 45 is a control lever 111 (Fig. 6) having secured thereto a concentric plate 112 slidable beneath the cabinet 25 of the machine. The plate 112 carries a pointer which is not shown in the drawings, but which is slidable in a slot formed in a plate 113 attached to the machine cabinet, the said plate bearing at the desired places engraved characters and words representing the different controls exerted over the machine, such as, "closed drawer" operation in which the closing of the cash drawer is compelled before the machine may be operated;—"open drawer" operation in which the machine may be operated without necessitating the closing of the cash drawer during successive registering operations;—"lock register" condition under which the registering mechanism is entirely locked against operation. The fourth or uppermost position of the pointer may be what is known as the "total and reset" position and when the control lever is adjusted to this position all the cabinet lids are unlocked and the machine conditioned for printing totals and resetting the totalizers. Only the mechanism which is appurtenant to the last mentioned position will be described, as the other devices form no part of the present invention and need not be described herein in detail. For further and full disclosure of the remaining features reference may be had to the Fuller application S. N. 263,125 for details of construction and operation.

Attached to the plate 112 by any desirable means is a plunger lock 114 which projects through the plate 113 and has at its lower end a flange 115 to engage notches 116 in a plate 118 attached to the side frame 21. The flange 115 is provided with a slot 117 which is adapted to be brought in the plane of the plate 118 by rotation of the bolt.

To adjust the control lever to the "total and reset" position all that is necessary is to insert the key in the plunger lock to rotate the bolt a quarter turn and thereby bring the notches 117 in the plane of the plate and to move the key and the parts movable therewith so that the index points to the desired position. The key is then given a quarter turn in the reverse direction so that the flange 115 of the bolt will co-operate with the desired notches 116. Removal of the key will now lock the control lever in its set position.

The lever 111 is provided with a gear sector 119 meshing with a gear sector 120 fast to the right hand end of the key shaft 30. Also secured to this shaft is a somewhat larger gear sector 121 meshing with another gear sector 122 rigidly mounted on a transaction shaft 123 (Fig. 2) which carries a disk 124 formed with a cam slot co-operating with a stud 125 carried by the rearward arm of a bell-crank 126.

As best shown in Fig. 2 the front lid 27 is hinged at its lower end to the cabinet 25 and suitably journaled between the side plates of the lid is a rock shaft 127 secured to the extreme ends of which are two locking spiders 128 and 129 drawn counter-clockwise by a spring 130. The element 128 engages a lug 131 attached to a portion of the cabinet 25 while the spider 129 is adapted to engage a flange on the stud 133 attached to the upper lid 26. As is evident from Fig. 2 the hook 129 is somewhat shorter than the hook 128 so that when the shaft 127 is rocked by the bolt of the lock 105 contacting with an arm 134 attached to the shaft 127 the spider 129 will be moved sufficiently to disengage it from the locking element 133 so as to release the upper lid only. In order to rock the shaft 127 to release both lids when the control lever is adjusted to the "total and reset" position the spider 128 has integral therewith a downwardly extending projection 135 normally contacting with a pin carried by the upper arm of the bell-crank 126. When the index is set to the "total and reset" position the shaft 123 will be rocked by the connections previously described to rock the bell-crank 126 counter-clockwise through the cam slot in disk 124, thereby rotating the shaft 127 sufficiently to unlock both lids.

As is best shown in Fig. 1 the lid 27 has attached thereto an arm 136 carrying a pin co-operating with a cam slot 137 formed in a plate 138 secured to the shaft 562. After the lower lid 27 has been unlocked and as it is opened outwardly the stud on the arm 136 will force the cam plate 138 rearwardly rocking the shaft 562 and thereby permitting the locking arm 109 (Fig. 2) to pass downwardly out of the path of the stud 110 carried by the printer frame. From the above it will be observed that when the front cover is opened the printer frame will be unlocked thereby permitting the proprietor or manager to obtain the total from the "D" totalizer in a manner which will now be described.

The manipulative device $108_D$ shown clearly in Fig. 2 is formed as a part of the lever 102 and has secured thereto a stud 140 which is adapted to co-operate with a groove 141 (Fig. 3) formed in the right hand supporting frame 56 which it will be recalled serves as a support for the totalizers and item printing wheels.

When the proprietor or manager desires to take a total from the upper counter, the manipulative device $108_D$ is grasped and by drawing it and the printer frame forward the stud 140 will enter the groove 141 and further movement of the printer frame will cause the clockwise rotation of the shaft 86 to the same extent that the box cam 88 rocks it during a regular operation of the machine. It may be mentioned in this connection that the initial movement of the device $108_D$ will serve to rock the arm 102 and shaft 86 relative to the frame 81 until the shoulder 101 contacts with the upper end of the hammer retracting pawl 99. The resistance to the further relative movement of 102 and 81 then becomes so great that the frame 81 turns more easily about the shaft 45 thereby carrying the stud 140 into the groove 141 as stated.

The cam groove 141 is so proportioned that it will produce the proper turning of the arm 102 and shaft 86 relative to the printer frame to release the printing hammer 95 at substantially the time that the platen 92 overlies the sub-total printing elements of the "D" totalizer. Referring to Fig. 3 it will be noted that the groove 141 is not concentric with respect to shaft 45 but at its lower end is closer to this shaft than at its open outer end. Thus the pin 140 will have substantially the same relative movement toward the shaft 45 in following the groove 141 as when the shaft 86 is rocked by cam 88. The end of the groove 141 serves to positively stop the forward movement of the printer frame when it is in its proper position to print a total from the upper totalizer. Whenever a total is printed the record strip will be fed in a manner described in detail in the Fuller application Ser. No. 263,125 so that after each total printing operation the record strip will be fed an increment.

The form in which the printed total appears upon the record strip is shown clearly in Fig. 7 where it will be observed there is indicated in addition to the printed totals, a series of transactions and adjacent to each a written notation designating some means of identifying each transaction as entered in the machne. To the left of the impression from the totalizer printing wheel of the highest order there will be noticed a special identifying character "15" which is provided for the purpose of identifying the number of the machine or the number of the manager, or the store, if so desired.

For producing this special identifying printing character there is attached to each totalizer frame a special printing element which is so situated that it will print along the total printing line. Each identifying printing type is formed as part of a member 142 (Figs. 5 and 8) the member 142 being apertured at one end to engage the totalizer wheel supporting shaft and being rigidly attached to the totalizer frame by a screw 143. The type element 142 can readily be replaced at any time by removing the totalizer frame, detaching the old printing element and substituting a new one therefor. This is quite desirable where changes are made in the store service system, as for instance, where a manager is transferred to another store and it is desired that the record strips which he sends to the head office shall continue to bear his identifying character.

After the amount has been entered upon the record strip it is desirable to reset the upper totalizer so as to accumulate the sales occurring during a subsequent period. The means for accomplishing this is best shown in Figs. 2, 5, and 9 where it will be seen that a resetting segment 144 is loosely mounted upon the shaft 45 and provided with teeth to engage the teeth of a pinion 145 attached to the totalizer wheel supporting shaft 58. The totalizer supporting shaft is provided with resetting notches and the totalizer wheels with resetting pawls which are quite well known in the art and described in many patents among those being the patent to Thos. Carney, #876,295 patented January 17, 1908. Normally the notches in the shaft and the pawls carried by the wheels are out of line as are the resetting segment 144 and pinion 145. To shift the shaft 58 longitudinally to bring the pawls in alinement with their corresponding notches and to bring the pinion 145 into the plane of segment 144 the totalizer shaft is provided with a thumb-piece 146 which in the totalizer resetting operation is pushed to the right. By then pulling the resetting lever 144 downwardly the shaft 58 will be rotated and the notches will then engage the pawls of the variously positioned totalizer wheels and reset them to zero. In order to insure that the totalizer wheels have been reset to zero by performing the above operation the printer frame may be again rocked forwardly and if all the totalizer elements have been restored to their zero position the printing impression will appear as a line of zeroes as shown in Fig. 7. If this operation is correct the manager then signs and dates the record strip, detaches it from the machine, and forwards it to the head office.

*Printing of monthly totals*

As has been stated hereinbefore the lower totalizer "M" is adapted to accumulate the sales during the month, for example, and the printing and the resetting of this totalizer is under the control of a special lock, the key of which is to be retained by the auditor. It is desirable, of course, that the lower totalizer be protected against any fraudulent operation and for this reason it is provided with and covered by a shield 148 (Figs. 2, 3, 5 and 9) which is secured to the top of the tie bar 24 by hinges 169. It will be noted that a portion of the cabinet 25 overlies and covers the screws which attach the hinges 169 to the cross bar so that this will prevent any attempt to remove the guard by the insertion of an instrument when the front cover 27 is open. In order to more fully and effectively prevent this the hinges may be welded to the tie bar 24 or attached thereto by rivets or any other suitable fastening means.

It will be apparent from the drawings that the rearward end of the guard 148 is quite close to the forward portion of the frame of the upper totalizer thus effectively preventing any attempt by persons to insert an instrument such as a wire under the guard and rotate the lower totalizer elements backwardly. To aid in preventing this improper tampering with the lower "secret" totalizer wheels there is riveted to the inside of the shield 148 a transverse shield 149 clearly shown in Figs. 2 and 3.

The shield 148 is substantially the width of the front cover 27 so that when unlocked it may be rotated about the hinges 169 to permit access to the lower totalizer. At its left end the shield 148 has secured thereto a lock 150, the key of which is to be rotated by the auditor whenever access to the lower totalizer is desired. The bolt of the lock is provided with a flange 151 (Figs. 3 and 4) engageable in a slot 152 formed in the forward portion of a plate 153 securely attached by rivets or other means to the left side frame 56. The flange 151 is provided with a cut out portion 154 so that when the key is inserted in the lock and the flange rotated the cut away portion 154 will be in the plane of the plate 153 thereby unlocking the shield 148 and permitting its rotation to the dotted line position shown in Fig. 3.

When the shield is in this position printing from the lower totalizer may be performed and this is accomplished by grasping a manipulative device 155$_M$, which is integral with the right printer side frame 81, and drawing it forward. Referring to Fig. 3, it will be seen that the supporting frame 56 is provided with a second slot 157 longer than the slot 141 previously referred to and having a different curvature. The stud 140 referred to hereinbefore is adapted also to co-operate with the slot 157. When the printer frame is pulled forward by means of the total printing device 155$_M$ the stud 140 will enter the slot 157 and cause a relative turning movement of the shaft 86 thereby retracting and releasing the hammer 95 for printing at substantially the time the platen is over the lower totalizer. It will be noted that the open end of the slot 157 is the same radial distance from the shaft 45 as the stud 140 so that the direct pivotal action of the frame 81 about the shaft 45 will serve to carry the stud 140 into the slot. This slot at its upper end is substantially concentric with respect to shaft 45 but toward its lower end approaches the shaft so that when the end is reached the stud 140 will be at substantially the same distance from the shaft as when the lower end of slot 141 is reached.

Fig. 7 illustrates an example of an impression taken from the lower totalizer to show the monthly sales as well as the identifying character "15" of the machine, store or manager. After the total has been printed from the lower totalizer the totalizer elements are reset in a manner similar to that explained in connection with the upper totalizer. It will be remembered that resetting is accomplished by forcing the totalizer supporting shaft 58 to the right and pulling the resetting lever 144 downward the same resetting lever being used for both totalizers. In order to prevent any attempt to force the totalizer supporting shaft 58 of the lower totalizer to the right by the insertion of an instrument and then resetting the same by pulling forward the resetting lever, which it will be observed, is under the lid 26, and therefore accessible to the clerks as well as the manager, the shield 148 is provided at its right hand side with a side plate 156 (Figs. 5 and 9) which is to the right of the resetting pinion attached to the lower totalizer supporting shaft 58 as viewed from the front of the machine. Any attempt to shift the totalizer supporting shaft by the insertion of an instrument when the shield is in normal position would be effectively prevented by the resetting pinion 145 abutting and bearing against the side plate 156.

However, when the shield 148 has been tilted forward and the total has been printed from the lower totalizer the totalizer may be reset, and the proof of the resetting operation may be obtained by printing in the manner specified for the upper totalizer, a second total upon the record strip which should exhibit a series of zeroes as clearly shown in Fig. 7. The portion which bears the monthly total is detached from the machine and retained by the auditor who delivers it to the head office for checking.

From the above description it will be seen that both totalizers are operated simultaneously in entering items while the printing of the totals standing thereon upon the record material and the resetting of the totalizers will occur independently and preferably at different intervals. This eliminates the necessity of reading the totals and transferring them to books, etc. and is a desirable and important feature of the present invention as it insures the correct recording of the items, as well as the daily and monthly totals, making an unchangeable record which is valuable for future reference.

While the form of mechanism herein shown and described is admirably adapted to fulfill the objects primarily stated, it is to be understood that it is not intended to confine the invention to the one form of embodiment herein shown and described as it is susceptible of embodiment in various forms all coming within the scope of the claims which follow.

What is claimed is:

1. In a cash register, the combination with a plurality of printing totalizers, a printing mechanism common to both printing totalizers for printing the totals therefrom, means under the control of a lock for printing from one totalizer and a supplemental lock acting jointly with the first mentioned lock for controlling the printing from the remaining totalizer.

2. In a cash register, the combination with a plurality of printing totalizers, a printing mechanism common to both printing totalizers for printing the totals therefrom, manipulative devices for causing the printing of totals from each totalizer, and a shield for one totalizer but movable to permit total printing therefrom, said shield permitting printing of a total from the other totalizer in any position of the shield.

3. In a cash register, the combination with a plurality of printing totalizers, a printing mechanism common to the printing totalizers for printing the totals therefrom, separate manipulative devices for controlling printing of totals from each totalizer and a shield for one totalizer for normally preventing access thereto and printing therefrom by its associated manipulative device but movable to permit such access and printing, said shield always permitting operation of the other manipulative device.

4. In a cash register, the combination with a plurality of printing totalizers, a movable printing frame movable to different extents for obtaining printed totals from each totalizer and a shield for one totalizer normally preventing movement of the printing frame to take a total from its associated totalizer but movable to permit such movement of said frame, said shield always permitting movement of the frame to take a total from the other totalizer.

5. In a cash register, the combination with a plurality of printing totalizers, a lock controlled movable printing frame for obtaining printed totals from each totalizer, and a lock controlled shield for one totalizer normally preventing movement of the printing frame to take a total from its associated totalizer but movable to permit such movement of said frame, said shield always permitting the printing of a total from the other totalizer.

6. In a cash register, the combination with a plurality of operating keys, a set of item type wheels, a differential mechanism under control of the keys for adjusting the type wheels to represent items, a differentially movable printing mechanism normally in a position to print the items upon the record strip, a plurality of printing totalizers, each adapted to accumulate all of the items printed, separate manipulative devices whereby the printing mechanism may be moved out of normal position and caused to print totals from each totalizer, and a plurality of locks for selectively controlling the printing from said totalizers.

7. In a cash register, the combination with a plurality of totalizers, a lock controlled shield for one totalizer and an additional lock controlled shield for covering the first mentioned shield and remaining totalizer.

8. In a cash register, the combination with a plurality of pivoted printing totalizers, a lock controlled shield for one totalizer normally preventing total printing therefrom, and an additional lock controlled shield for covering the first mentioned shield and the other of said totalizers normally preventing printing from any totalizer.

9. In a cash register, the combination with a plurality of totalizers having separate resetting devices, a resetting segment common to both totalizers for resetting them, and a shield for one totalizer having a portion normally preventing the operation of its associated resetting device said shield always permitting operations of the other resetting device.

10. In a cash register, the combination with a plurality of totalizers having separate resetting devices, a resetting segment common to both totalizers for resetting them, a shield for one totalizer having a portion normally preventing the operation of its associated resetting device, and a pair of locks operable singly and jointly for controlling said resetting devices, one of said locks serving to control said shield.

11. In a cash register, the combination with a totalizer having a slidable resetting shaft, a pinion secured to the shaft, a resetting segment adapted to co-operate with said pinion, and a shield for said totalizer having a portion normally preventing the movement of the resetting shaft to engage the pinion with the segment.

12. In a cash register, the combination with a plurality of totalizers, a differential mechanism, an operating mechanism, a slide having cam slots one for each totalizer for simultaneously meshing the totalizers with the differential mechanism connections for automatically shifting the slide during an operation of the operating mechanism, and a special key for neutralizing the action of said automatic shifting connections and thereby rendering the slide ineffective during an operation of the operating mechanism.

13. In a machine of the class described, a plurality of recording totalizers, means for simultaneously entering items into said totalizers, means for printing the totals standing on each totalizer and resetting the same, and a pair of lock controlled means one of which controls the total printing and resetting of one totalizer and both of which jointly control the total printing and resetting of another totalizer.

14. In a machine of the class described a plurality of normally inaccessible totalizers, common means for resetting said totalizers when rendered accessible, common means for printing totals from said totalizers when rendered accessible, lock controlled means for rendering one of said totalizers accessible, and independent lock controlled means for rendering the other totalizer accessible when the first mentioned totalizer has been rendered accessible.

15. In a cash register, the combination with a plurality of printing totalizers, a lock-controlled shield for one totalizer normally preventing total printing therefrom, and an additional lock controlled shield for covering the first mentioned shield and the other of said totalizers, normally preventing printing from any totalizer.

16. In a cash register, the combination with a plurality of totalizers, a plurality of operating keys, a differential mechanism actuated by said keys, a member for simultaneously meshing the totalizers with the differential mechanism, connections for automatically shifting the member during an operation of the operating mechanism, and a special key for neutralizing the action of said automatic shifting connections and thereby rendering said member ineffective during an operation of the operating mechanism.

In witness whereof I have signed my name hereto this 20th day of August 1924.

RAYMOND E. RICE.